United States Patent

Motohashi et al.

[11] Patent Number: 5,132,987
[45] Date of Patent: Jul. 21, 1992

[54] BIDIRECTIONAL COMMUNICATION LINE BUFFER APPARATUS

[75] Inventors: Minoru Motohashi; Akira Hayama; Yoichi Yamazaki, all of Saitama, Japan

[73] Assignee: Pioneer Electronic Corporation, Tokyo, Japan

[21] Appl. No.: 519,535

[22] Filed: May 4, 1990

[30] Foreign Application Priority Data

May 22, 1989 [JP] Japan .................. 1-126790

[51] Int. Cl.$^5$ ............................ H04B 3/36
[52] U.S. Cl. ........................ 375/3; 375/36; 178/70 R
[58] Field of Search .................. 375/3, 36, 4; 370/85.11, 32; 178/70 R, 71 R, 71 J

[56] References Cited

U.S. PATENT DOCUMENTS

| | | | |
|---|---|---|---|
| 3,904,838 | 9/1975 | Stewart | 379/344 |
| 4,154,978 | 4/1979 | Tu | 370/26 X |
| 4,301,532 | 11/1981 | Janetzky | 370/85.11 |
| 4,577,327 | 3/1986 | Nambu | 375/4 |
| 4,621,360 | 11/1986 | Inoue | 370/85.11 |

FOREIGN PATENT DOCUMENTS 0287119 10/1988 European Pat. Off. .

Primary Examiner—Benedict V. Safourek
Assistant Examiner—Tesfaldet Bocure
Attorney, Agent, or Firm—Sughrue, Mion, Zinn, Macpeak & Seas

[57] ABSTRACT

The invention relates to a bidirectional communication line buffer apparatus in which the communication direction of data of a bidirectional data line and the length of the data are judged. A bidirectional buffer circuit receives the results of such judgement and is made nonconductive on the basis of a data termination indication obtained from the received judgement after data is conducted in the communication direction based on the received judgement. Accordingly, the communication data waveform shaping and the driving capability are improved.

6 Claims, 5 Drawing Sheets

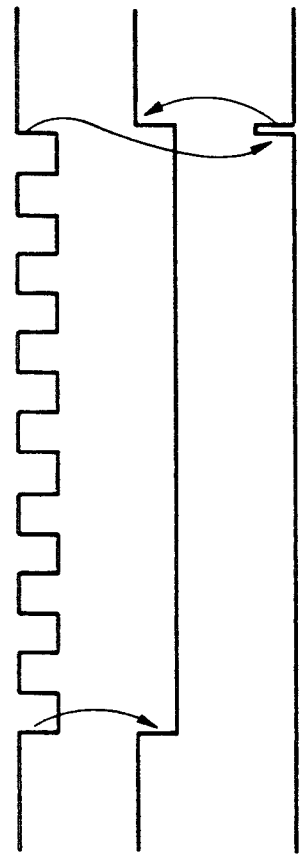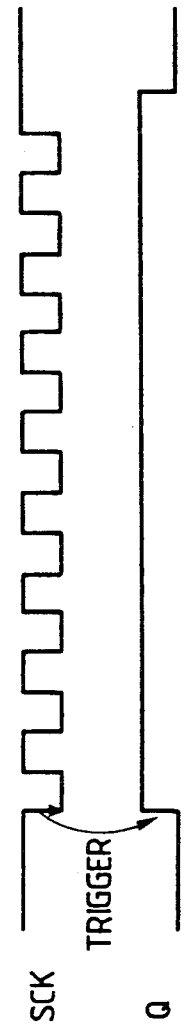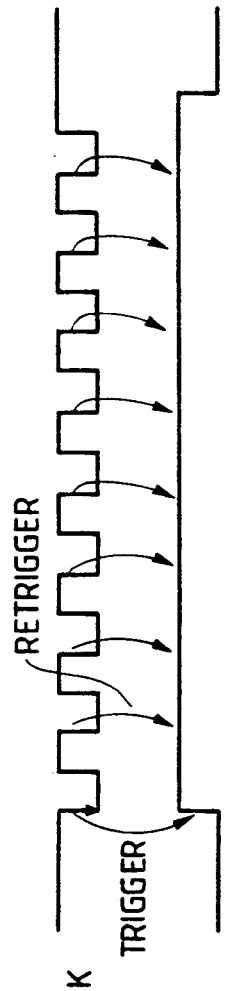
FIG. 2(a)
FIG. 2(b)
FIG. 2(c)
FIG. 4(a)
FIG. 4(b)
FIG. 5(a)
FIG. 5(b)

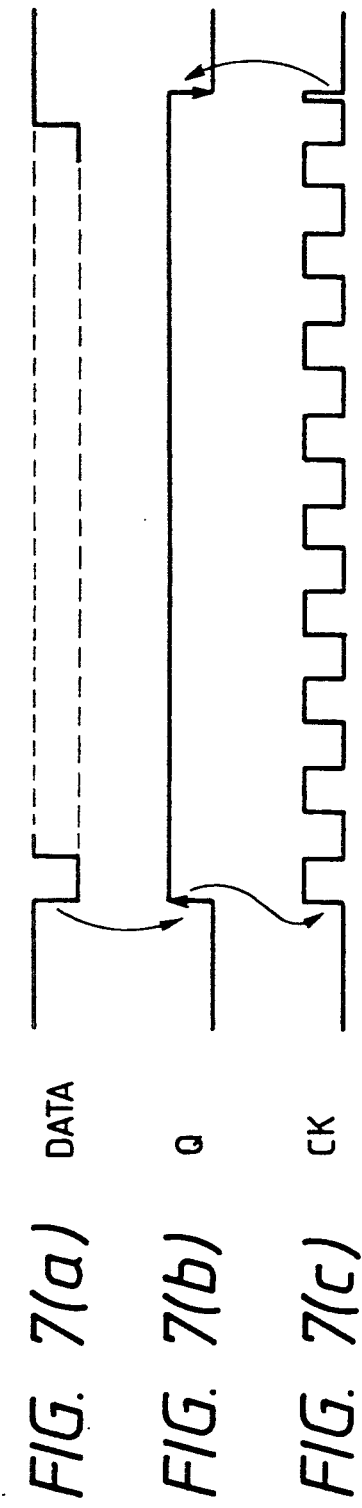
FIG. 7(a) DATA
FIG. 7(b) Q
FIG. 7(c) CK
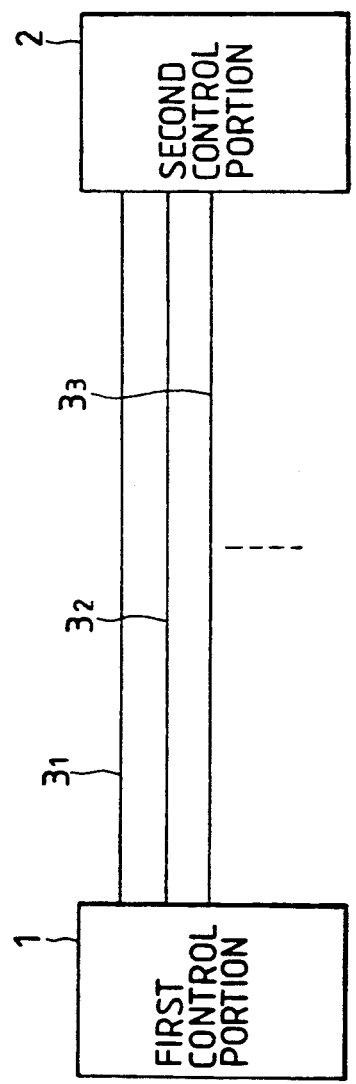
FIG. 8
PRIOR ART

BIDIRECTIONAL COMMUNICATION LINE BUFFER APPARATUS

BACKGROUND OF THE INVENTION

The present invention relates to a bidirectional communication line buffer apparatus provided on a bidirectional communication line used for connecting appliances.

FIG. 8 is a block diagram showing a conventional bidirectional communication line used for connecting appliances.

In FIG. 8, the reference numerals 1 and 2 designate a first control portion and a second control portion which are provided in a first appliance and a second appliance respectively. The first and second control portions are connected through a plurality of bidirectional communication lines, such as, for example, a serial clock line $3_1$, a data line $3_2$, a reset line $3_3$, . . .

Next, the operation of the conventional system of FIG. 8 will be described.

In the case of data to be transmitted from the first control portion 1 to the second control portion 2, when the first control portion 1 sends out serial clock signals and data signals onto the serial clock line $3_1$ and the data line $3_2$ respectively, the second control portion 2 judges the state of the data signals received on the data line $3_2$ on the basis of the serial clock signals received on the serial clock line $3_1$ to thereby receive the data signals transmitted from the first control portion 1.

For example, upon reception of a transmission termination data signal inserted in the data at its last portion, the second control portion 2 terminates the data reception from the first control portion 1.

The same applies to the case where data is to be transmitted from the second control portion 2 to the first control portion 1.

Thus, the conventional appliances are connected through one system of a plurality of lines $3_1$, $3_2$, $3_3$, . . . Accordingly, when the scale of the whole system is small, the number of control portions is also small as shown in FIG. 8 so that the total length of the respective lines $3_1$, $3_2$, $3_3$, . . . of the data transmitting-end control portion and the data receiving-end control portion is short and the transmitting pulse waveform is never distorted, thereby permitting data to be transmitted accurately.

As the scale of the system becomes large, however, the number of control portions correspondingly increases so that the total length of the respective lines $3_1$, $3_2$, $3_3$, . . . of the data transmitting-end control portion and the data receiving-end control portion becomes long even if the length of each of the lines $3_1$, $3_2$, $3_3$, . . . is fixed so that the transmitting pulse waveform becomes distorted.

When the distortion of the transmitting pulse waveform becomes excessive, there results an error situation in the data transmission process.

A buffer apparatus can be used for amplifying a pulse waveform in the midway of each of the lines $3_1$, $3_2$, $3_3$, . . . Since each of the lines $3_1$, $3_2$, $3_3$, . . . is a bidirectional communication line, however, it is necessary to drive the buffer apparatus on the basis of a judgement of the communication direction of data. Accordingly, the configuration becomes complicated because of the necessity of driving the buffer apparatus in accordance with the communication direction.

SUMMARY OF THE INVENTION

The present invention eliminates the problems described above and provides a bidirectional communication line buffer apparatus in which data transmission can be accurately carried out even if the bidirectional communication line is long, and which can be inserted in a desired position in the bidirectional communication line while data length is never affected by the insertion so that a number of control portions can be connected to perform system operation.

The bidirectional communication line buffer apparatus according to the present invention is made up of a communication direction judgement means for judging the communication direction of data of a bidirectional data line, a data length judgment means for judging a data length of the data, and a bidirectional buffer circuit provided on the bidirectional data line and arranged to be made non-conductive on the basis of a data termination output produced from the data length judgment means after data is conducted in the communication direction based on the communication direction output produced from the communication direction judgment means.

The bidirectional communication line buffer apparatus according to another aspect of the present invention is made up of a communication direction judgment means for judging the communication direction of clock signals of data of a bidirectional clock line, a data length judgment means for judging a predetermined data length on the basis of the number of clock signals of the data, and a bidirectional buffer circuit provided at least on the bidirectional clock line and a bidirectional data line and arranged to be made non-conductive on the basis of a data termination output produced from the data length judgment means after data is conducted in the communication direction based on the communication direction output produced from the communication direction judgment means.

The bidirectional buffer circuit of the bidirectional communication line buffer apparatus according to the present invention is made non-conductive on the basis of a data length termination output produced from the data length judgement means after data is conducted in the communication direction based on the communication direction output produced by the communication direction judgment means.

BRIEF DESCRIPTION OF THE DRAWINGS

FIGS. 2(a) through 2(c) are waveform diagrams for explaining the operation of the embodiment of FIG. 1.

FIGS. 4(a), 4(b), 5(a) and 5(b) are waveform diagrams for explaining the operation of the embodiment of FIG. 3.

FIGS. 7(a) through 7(c) are waveform diagrams for explaining the operation of the embodiment of FIG. 6.

FIG. 8 is a block diagram showing a conventional bidirectional communication line for connecting appliances.

DETAILED DESCRIPTION OF THE PREFERRED EMBODIMENTS

Figure 1:
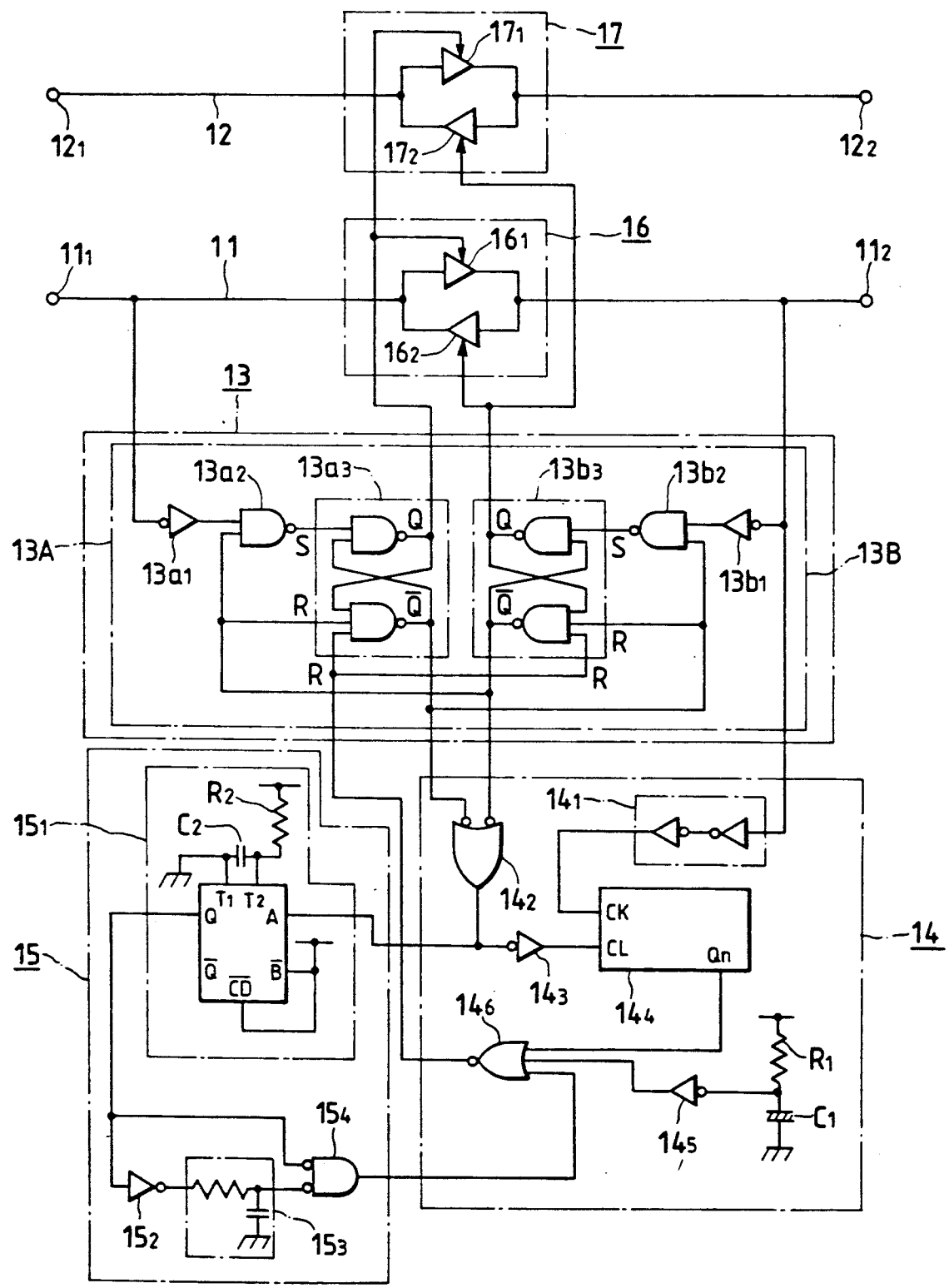
FIG. 1 is a block diagram showing the configuration of the buffer apparatus of a synchronous type bidirectional communication line buffer apparatus according to an embodiment of the present invention.

Referring to the drawings, embodiments of the present invention will be described hereunder.

FIG. 1 is a block diagram showing the configuration of the buffer apparatus of a synchronous-type bidirectional communication line buffer apparatus according to an embodiment of the present invention.

In FIG. 1, the reference numeral 11 designates a serial clock line acting as a bidirectional communication line. A first terminal $11_1$ is connected to a control portion of a not-shown first appliance through a not-shown serial clock line and a second terminal $11_2$ is connected to a control portion of a not-shown second appliance through a not-shown serial clock line.

The reference numeral 12 designates a bidirectional data line acting as a bidirectional communication line. A first terminal $12_1$ is connected to the control portion of the not-shown first appliance through a not-shown data line and a second terminal $12_2$ is connected to the control portion of the not-shown second appliance through a not-shown data line.

The reference numeral 13 designates a communication direction judgement circuit for judging the communication direction of the serial clock signals supplied to the serial clock line 11 from the first and second terminals $11_1$ and $11_2$. The communication direction judgement circuit 13 is made up of a first communication direction judgement circuit 13A for judging the supply of serial clock signals applied to the first terminal $11_1$ and a second communication direction judgement circuit 13B for judging the supply of serial clock signals applied to the second terminal $11_2$.

The first communication direction judgment circuit 13A is made up of an inverter circuit $13a_1$ for inverting the serial clock signals supplied to the first terminal $11_1$, a NAND circuit $13a_2$ having two inputs supplied with an output of the inverter circuit $13_1$ and an output $\overline{Q}$ of an RS filp-flop circuit $13b_3$ of the second communication direction judgement circuit 13B respectively, and an RS flip-flop circuit $13a_3$ having an input S supplied with an output of the NAND circuit $13a_2$ and two R inputs supplied with the output $\overline{Q}$ of an RS flip-flop circuit $13b_3$ of the second communication direction judgement circuit 13B and an output of a NOR circuit $14_6$ of a data length judgement circuit 14 which will be described later, respectively.

The second communication direction judgment circuit 13B has a configuration similar to that of the above communication direction judgement circuit 13A.

The reference numeral 14 designates the data length judgement circuit which is made up of a buffer circuit $14_1$ for amplifying the serial clock signals supplied to the serial clock line 11, an INV-OR circuit $14_2$ having two inputs supplied with the respective outputs Q of the RS flip-flop circuits $13a_3$ and $13b_3$ constituting the first and second communication direction judgment circuit 13A and 13B respectively, an inverter circuit $14_3$ for inverting an output of the INV-OR circuit $14_2$, a 4-bit counter $14_4$ having an input CK supplied with an output of the buffer circuit $14_1$ and another input CL supplied with an output of the inverter circuit $14_3$ so as to produce a high-state pulse as its output $Q_4$ when it has counted eight serial clock pulses, an inverter circuit $14_5$, and the NOR circuit $14_6$ having three inputs supplied with the output $Q_4$ of the 4-bit counter $14_4$, an output of the inverter circuit $14_5$, and an output of an INV-AND circuit $15_4$ of a protection circuit 15 which will be described later.

The inverter circuit $14_5$ is supplied, from a series circuit including a resistor $R_1$ and a capacitor $C_1$, with a reset signal for an initial-resetting operation of the RS flip-flop circuits $13a_3$ and $13b_3$ of the first and second communication direction judgement circuits 13A and 13B respectively when a power source is turned on.

The reference numeral 15 designates the protection circuit 15 which is made up of a monostable multivibrator $15_1$ having an input A supplied with the input of the INV-OR circuit $14_2$ of the data length judgement circuit 14, an inverter circuit $15_2$ having an input supplied with an output Q of the monostable multivibrator $15_1$, an integrating circuit $15_3$ connected to the inverter circuit $15_2$, and the INV-AND circuit $15_4$ having two inputs supplied with an output of the integrating circuit $15_3$ and the output Q of the monostable multivibrator $15_1$.

A resistor $R_2$ and a capacitor $C_2$ for determining a time constant are connected to the monostable multivibrator $15_1$.

The reference numeral 16 designates a bidirectional buffer circuit inserted in the serial clock line 11. The bidirectional buffer circuit 16 is made up of a first three-state buffer circuit $16_1$ for amplifying serial clock signals supplied to the first terminal $11_1$ on the basis of the output Q of the RS flip-flop circuit $13a_3$ of the first communication direction judgement circuit 13A and a second three-state buffer circuit $16_2$ for amplifying serial clock signals supplied to the second terminal $11_2$ on the basis of the output Q of the RS flip-flop circuit $13b_3$ of the second communication direction judgement circuit 13B.

The reference numeral 17 designates another bidirectional buffer circuit inserted in the data line 12. The bidirectional buffer circuit 17 is made up of a first three-state buffer circuit $17_1$ for amplifying data signals supplied to the first terminal $12_1$ on the basis of the output Q of the RS flip-flop circuit $13a_3$ of the first communication direction judgement circuit 13A and a second three-state buffer circuit $17_2$ for amplifying data signals supplied to the second terminal $12_2$ on the basis of the output Q of the RS flip-flop circuit $13b_3$ of the second communication direction judgement circuit 13B.

FIGS. 2(a) through 2(c) are waveform diagrams helpful for explaining the operation of the buffer apparatus of FIG. 1. FIG. 2(a) shows the serial clock pulse signals SCK supplied to each of the first and second terminals $11_1$ and $11_2$ of the serial clock line 11, FIG. 2(b) shows the output $\overline{Q}$ of each of the RS flip-flop circuits $13a_3$ and $13b_3$, and FIG. 2(c) shows the output $Q_4$ of the 4-bit counter $14_4$.

Next, the operation of the buffer apparatus will be described.

First, in the initial state, a high-state serial clock pulse signal SCK is supplied to each of the first and second terminals $11_1$ and $11_2$ as shown in FIG. 2(a), a reset signal is supplied to the inverter circuit $14_5$ from the series circuit of the resistor $R_1$ and the capacitor $C_1$, and the RS flip-flop circuits $13a_3$ and $13b_3$ are in their reset state. Accordingly, the output Q of each of the RS flip-flop circuits $13a_3$ and $13b_3$ is in the low state, the output $\overline{Q}$ of each of the RS flip-flop circuits $13a_3$ and $13b_3$ is in the high state as shown in FIG. 2(b), and the output $Q_4$ of the 4-bit counter $14_4$ is in the low state as shown in FIG. 2(c).

Accordingly, all of the first three-state buffer circuits $16_1$ and $17_1$ and the second three-state buffer circuits $16_2$ and $17_2$ are in the floating state.

In this condition, if a serial clock pulse signal SCK in the state as shown in FIG. 2(a) is supplied to the first terminal $11_1$ and the state of the serial clock pulse SCK changes to low, the state of the output of the inverter circuit $13a_1$ changes to high so that the state of the output of the NAND circuit $13a_2$ changes to low.

IF the output of the NAND circuit $13a_2$ changes in a manner as described above, the state of the output Q of the RS flip-flop circuit $13a_3$ changes from low to high and the state of the output $\overline{Q}$ of the same changes from high to low as shown in FIG. 2(b), so that the first three-state buffer circuits $16_1$ and $17_1$ are operative and the serial clock pulse signals and data signals supplied to the first terminals $11_1$ and $12_1$ are transferred to the second terminals $11_2$ and $12_2$ after being amplified by the first three-state buffer circuits $16_1$ and $17_1$ respectively.

Further, since the state of the output of the INV-OR circuit $14_2$ changes from low to high and the state of the output of the inverter circuit $14_3$ changes from high to low, the clear state of the 4-bit counter $14_4$ is released so that the serial clock pulse signal SCK supplied to the first terminal $11_1$ is amplified by the buffer circuit 14 and then supplied to the 4-bit counter $14_4$ so as to be counted therein.

In the above-mentioned condition, if the state of the serial clock pulse SCK changes from low to high, the outputs Q and $\overline{Q}$ of the RS flip-flop circuit $13a_3$ as well as the output of the NAND circuit $13b_2$ are held as they are, while the output of the NAND circuit $13a_2$ changes.

Accordingly, even if serial clock pulses SCK are supplied to the second terminal $11_2$, the second three-state buffer circuits $16_2$ and $17_2$ maintain their floating state and the first three-state buffer circuits $16_1$ and $17_1$ maintain their operative state.

When the 4-bit counter $14_4$ has counted eight serial clock pulse signals SCK, the output $Q_4$ of the 4-bit counter $14_4$ changes in a manner as shown in FIG. 2(c) so that the RS flip-flop circuit $13a_3$ is reset to the initial state. Accordingly, the outputs Q and $\overline{Q}$ of the RS flip-flop circuit $13a_3$ change from high to low and from low to high respectively, as shown in FIG. 2(b).

Accordingly, the first three-state buffer circuits $16_1$ and $17_1$ are changed to the floating state.

If the supply of the serial clock pulse signals SCK to the first terminal $11_1$ stops in the midway of operation of the various parts in a manner as described above, the first three-state buffer circuits $16_1$ and $17_1$ are forcedly reset so as to be in the floating state with the time constant (which is longer than the time required for transmission of one data signal and shorter than the time from the start of one data transmission to the start of the next data transmission) determined by the resistor $R_1$ and the capacitor $C_1$ connected to the monostable multivibrator $15_1$ of the protection circuit 15.

Accordingly, if abnormal data having bits constituting one word is transmitted for any reason in the midway of data transmission, it is possible that various parts of the system are reset into an initial state.

According to this embodiment, as described above, by insertion of a bidirectional communication line buffer apparatus in a long bidirectional communication line, it is possible to improve the communication data waveform shaping as well as the drive capability to enable error-free communication.

The bidirectional communication line buffer apparatus may be provided singly at a desired position in a bidirectional communication line.

Since the communication direction is judged for every minimum number of bits constituting one word, the system is not affected by a communication protocol.

Further, even in a system which includes a plurality of bidirectional communication lines, if the communication direction of any one of the bidirectional communication lines is judged, it is possible to control the other bidirectional communication lines, and therefore making it necessary to provide only a bidirectional buffer circuit in each of the other bidirectional communication lines.

Figure 3:
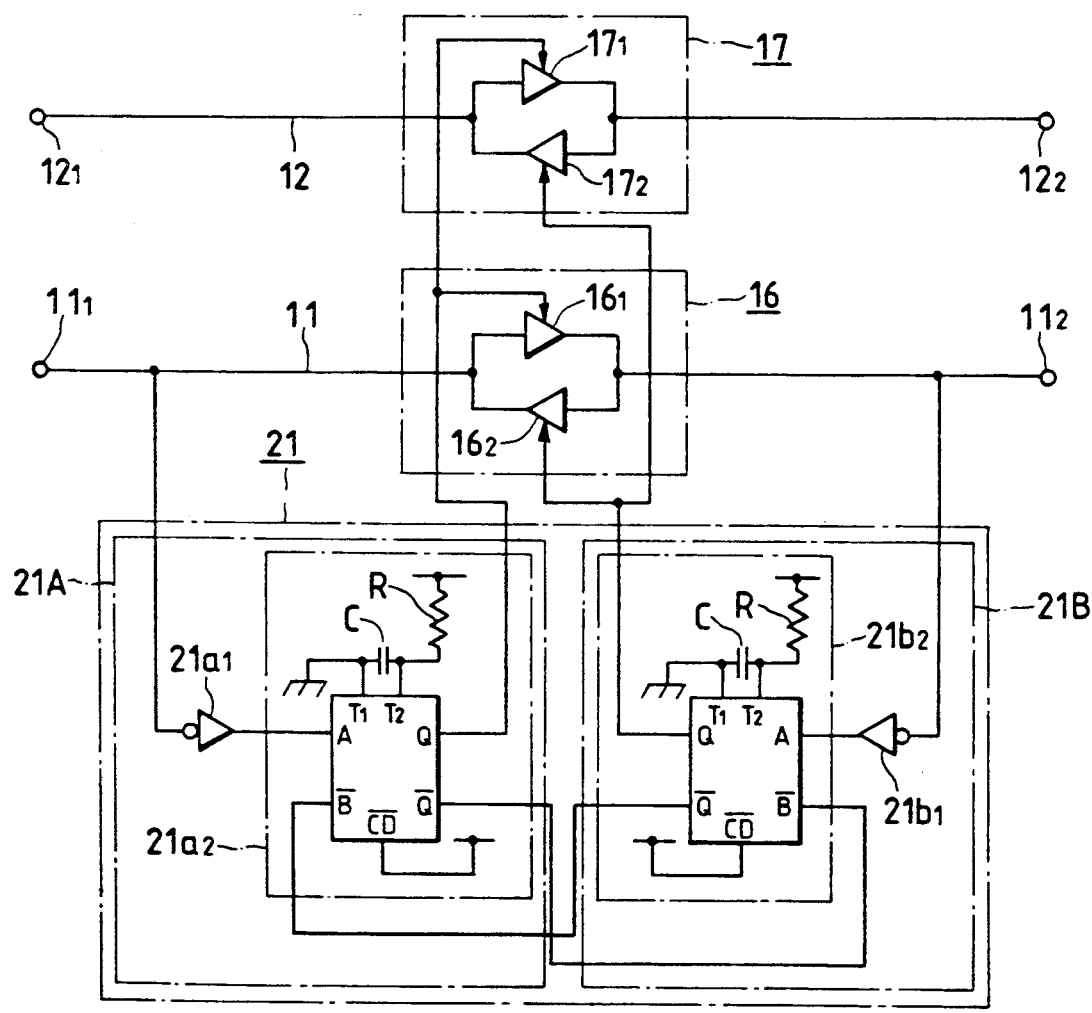
FIG. 3 is a block diagram showing the configuration of the buffer apparatus of a synchronous type bidirectional communication line buffer apparatus according to another embodiment of the present invention.

FIG. 3 is a block diagram showing the configuration of the buffer apparatus of a synchronous type bidirectional communication line buffer apparatus according to another embodiment of the present invention.

In FIG. 3, items the same as or equivalent to those in FIG. 1 are referenced correspondingly and their description will be omitted.

The reference numeral 21 designates a judgement circuit for judging the communication direction and data length. The judgement circuit 21 is made up of a first judgement circuit 21A and a second judgement circuit 21B.

The first judgment circuit 21A is made up of an inverter circuit $21a$ for inverting the serial clock signal supplied to the first terminal $11_1$, and a monostable multivibrator $21a_2$ having two inputs A and $\overline{B}$ supplied with an output of the inverter circuit $21a_1$ and an output $\overline{Q}$ of a monostable multivibrator $21b_2$ of the second judgement circuit 21B respectively, an output Q of the monostable multivibrator $21a_2$ being supplied to each of first buffer circuits $16_1$ and $17_1$ of bidirectional buffer circuits 16 and 17 respectively.

The second judgement circuit 21B has a configuration similar to that of the above judgement circuit 21A.

A time constant determining circuit comprising a resistor R and a capacitor C for determining a time constant is connected to each of the monostable multivibrators $21a_2$ and $21b_2$.

Each of the monostable multivibrators $21a_2$ and $21b_2$ may be either one of a monostable multivibrator of the trigger type in which when once triggered the output thereof is inverted only in a period of a time constant (set time) and a monostable multivibrator of the retrigger type in which when triggered again within a set time the set time is reset.

FIGS. 4(a) and 4(b) are waveform diagrams for explaining the operation in the case where each of the monostable multivibrators $21a_2$ and $21b_2$ is of the trigger type. FIG. 4(a) shows the serial clock pulse signals SCK supplied to each of the first and second terminals $11_1$ and $11_2$ of the serial clock line 11, and FIG. 4(b) shows the output Q of each of the monostable multivibrators $21a_2$ and $21b_2$.

Next, the operation of the buffer apparatus will be described.

First, in the initial state, since a high-state serial clock pulse SCK is supplied to each of the first and second terminals $11_1$ and $11_2$ as shown in FIG. 4(a), the output Q and $\overline{Q}$ of each of the monostable multivibrators $21a_2$ and $21b_2$ are in the low state and in the high state respectively as shown in FIG. 4(b).

Accordingly, all of the first three-state buffer circuits $16_1$ and $17_1$ and the second three-state buffer circuits $16_2$ and $17_2$ are in the floating state.

In this condition, if a serial clock pulse signal SCK in the state as shown in FIG. 4(a) is supplied to the first terminal $11_1$ and the state of the serial clock pulse signal SCK changes to low, the state of the output of the inverter circuit $21a_1$ changes to high so that the state of the output Q of the monostable multivibrator $21a_2$ changes to high as shown in FIG. 4(b) only for a set time.

Accordingly, data can be transmitted if the above-mentioned set time is established so as to be longer than the time required for transmission of the data.

When the state of the output of the monostable multivibrator $21a_2$ changes to low after the set time, the first three-state buffer circuits $16_1$ and $17_1$ become in the floating state.

Accordingly, the same effects as experienced in the first-mentioned embodiment can be obtained.

FIGS. 5(a) and 5(b) are waveform diagrams for explaining the operation in the case where each of the monostable multivibrators $21a_2$ and $21b_2$ is of the retrigger type. FIG. 5(a) shows the serial clock pulse signals SCK supplied to each of the first and second terminals $11_1$ and $11_2$ of the serial clock line 11, and FIG. 5(b) shows the output Q of each of the monostable multivibrators $21a_2$ and $21b_2$.

Next, the operation of the buffer apparatus will be described.

First, in the initial state, a serial clock pulse signal SCK in the state shown in FIG. 5(a) is supplied to each of the first and second terminals $11_1$ and $11_2$. When the state of the serial clock pulse SCK changes to low, the state of the output of the inverter circuit $21a_1$ changes to high so that the output Q of the monostable multivibrator $21a_2$ changes to high as shown in FIG. 5(b) only for the set time.

If the set time is established so as to be longer than the time required for transmission of one bit data, the monostable multivibrator $21a_2$ is successively retriggered by the serial clock pulse signals SCK so that data of a predetermined number of bits can be transmitted.

Then, after a predetermined time has passed from the stopping of the supply of the serial clock pulse signals SCK, the state of the monostable multivibrator $21a_2$ changes to low so that the first three-state buffer circuits $16_1$ and $17_1$ become in the floating state.

Accordingly, not only the same effects as those in the first-mentioned embodiment can be obtained, but also the apparatus of this example can be used in the case of transmission of data of a desired number of bits.

Figure 6:
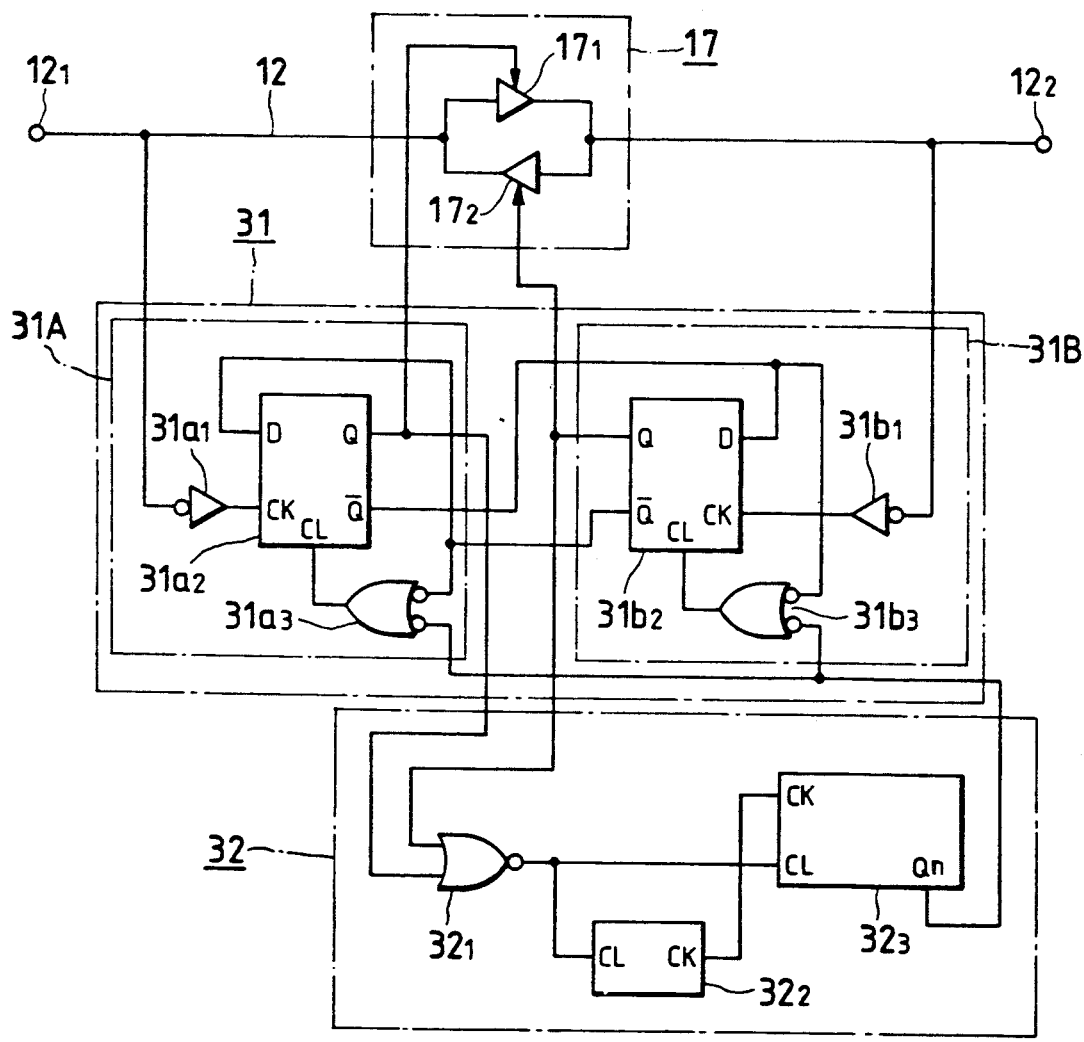
FIG. 6 is a block diagram showing the configuration of the buffer apparatus of an asynchronous type bidirectional communication line buffer apparatus according to a further embodiment of the present invention.

FIG. 6 is a block diagram showing the configuration of an asychronous type bidirectional communication line buffer apparatus according to a further embodiment of the present invention.

In FIG. 6, items the same as or equivalent to those in FIG. 1 are referenced correspondingly and the description about them will be omitted.

The reference numeral 31 designates a communication direction judgement circuit for judging the communication direction of the data supplied to the data line 12 from the first and second terminals $12_1$ and $12_2$. The communication direction judgement circuit 31 is made up of a first communication direction judgement circuit 31A for judging the supply of data to the first terminal $12_1$ and a second communication direction judgement circuit 31B for judging the supply of data to the second terminal $12_2$.

The first communication direction judgement circuit 31A is made up of an inverter circuit $31a_1$ for inverting the data supplied to the first terminal $12_1$, and a D-type flip-flop circuit $31a_2$ having an input CK supplied with an output of the invertor circuit $31a_1$, another input D supplied with an output $\overline{Q}$ of a D-type flip-flop circuit $31b_2$ of the second communication direction judgement circuit 31B and a further input CL supplied with an output of an INV-OR circuit $31a_3$ which has two inputs supplied with the output $\overline{Q}$ of the D-type flip-flop circuit $31b_2$ of the second communication direction judgement circuit 31B and an output $Q_n$ of a counter $32_3$ of a data length judgement circuit 32 which will be described later, an output Q of the D-type flip-flop circuit $31a_2$ is supplied to a first three-state buffer circuit $17_1$ constituting a bidirectional buffer circuit 17.

The second communication direction judgement circuit 31B has a configuration similar to that of the above communication direction judgment circuit 31A.

The reference numeral 32 designates the data length judgment circuit which is made up of a NOR circuit $32_1$ having two inputs supplied with the respective outputs Q of the D-type flip-flop circuits $31a_3$ and $31b_3$ of the first and second communication direction judgement circuits 31A and 31B respectively, a clock generator $32_2$ having an input CL supplied with an output of the NOR circuit $32_1$, and the counter $32_3$ having two inputs CK and CL supplied with an output CK of the clock generator $32_2$ and an output of the NOR circuit $32_1$ respectively.

FIGS. 7(a) through 7(c) are waveform diagrams for explaining the operation of the embodiment shown in FIG. 6. FIG. 7(a) shows the data DATA supplied to each of the first and second terminals $12_1$ and $12_2$ of the data line 12, FIG. 7(b) shows the output Q of each of the D-type flip-flop circuits $31a_2$ and $31b_2$, and FIG. 7(c) shows the clock pulse CK produced from the clock generator $32_2$.

Next, the operation of the buffer apparatus will be described.

First, in the initial state, since a data DATA in the high state as shown in FIG. 7(a) is supplied to each of the first and second terminals $12_1$ and $12_2$, the output Q of each of the D-type flip-flop circuits $31a_2$ and $31b_2$ is in the low state as shown in FIG. 7(b), the output Q of each of the D-type flip-flop circuits $31a_2$ and $31b_2$ is in the high state, and the output $Q_n$ of the counter $32_3$ of the data length judgement circuit 32 is in the low state.

Accordingly, the first and second three-state buffer circuits $17_1$ and $17_2$ are in the floating state.

In this condition, if a data DATA in the state as shown in FIG. 7(a) is supplied to the first terminal $12_1$ and the state of the data DATA changes to low, the state of the output of the inverter circuit $31a_1$ changes to high so that the state of the output Q of the D-type flip-flop circuit $31a_2$ changes to high as shown in FIG. 7(b) and the state of the output $\overline{Q}$ of the same changes to low.

In the outputs Q and $\overline{Q}$ of the D-type flip-flop circuit 31ahd 2 change in a manner as described above, the first three-state buffer circuit $17_1$ becomes operative and the data DATA supplied to the first terminal $12_1$ is transferred to the second terminal $12_2$ after being amplified by the first three state buffer circuit $17_1$.

Further, since the state of the output of the NOR circuit $32_1$ changes from high to low, the clear state of the clock generator $32_2$ and the counter $32_3$ is achieved Accordingly, the clock generator $32_2$ starts to generate the clock pulses CK as shown in FIG. 7(c) and the counter $32_3$ counts the clock pulses CK generated by the clock generator $32_2$.

In the above-mentioned condition, even if the data DATA is supplied to the second terminal $12_2$ of the data line 12, the D-type flip-flop circuit $31b_2$ maintains its initial state because the output $\overline{Q}$ of the D-type flip-flop circuit $31a_2$ is in the low state.

Accordingly, even if the data DATA is supplied to the second terminal $12_2$, the second three-state buffer circuit $17_2$ maintains its floating state and the first three state buffer circuit $17_1$ maintains its operative state.

When the counter $32_3$ has counted clock pulses CK corresponding to a predetermined number of bits, the output $Q_n$ of the counter $32_3$ changes so that the D-type flip-flop circuit $31a_2$ is reset to the initial state. Accordingly, the state of the output Q of the D-type flip-flop circuit $31a_2$ changes from high to low as shown in FIG. 7(b) and the state of the output $\overline{Q}$ of the same changes from low to high respectively.

Accordingly, the first three-state buffer circuit $17_1$ achieves the floating state.

According to this embodiment, the same effects achieved in the previous embodiment can be similarly obtained.

Although description has been made in the above embodiment only as to the case where serial clock pulses SCK and data are supplied to the first terminals $11_1$ and $12_1$, the same operation as above is performed in the case where serial clock pulses SCK and data are supplied to the second terminals $11_2$ and $12_2$.

Although description has been made as to the case where the data length judgement means is constituted by using a timer for a baud rate generator in the above embodiment of the asynchronous type shown in FIG. 6, the data length judgement means may be constituted by using a monostable multivibrator in the same manner as in the embodiment of the synchronous type of FIG. 3.

According to the present invention, as described above, the bidirectional buffer circuit inserted in the bidirectional communication line is configured so that after data is conducted in the communication direction judged by the communication direction judgement circuit, the bidirectional buffer circuit is made non-conductive on the basis of the data length termination output produced from the data length judgement circuit. Accordingly, it is possible to improve the waveform shaping of the communication data as well as the driving capability to ensure error-free communication.

Further, the bidirectional buffer circuit can be provided singly in a desired position in the bidirectional communication line.

Further, since the communication direction is judged for every minimum number of bits constituting one word or for every word, the bidirectional buffer circuit is not affected by a communication protocol.

Furthermore, even in a system which includes a plurality of bidirectional communication lines, if the communication direction of any one of the bidirectional communication lines is judged, it is possible to control the other bidirectional communication lines, and therefore making it necessary to provide only a bidirectional buffer circuit in each of the other bidirectional communication lines.

We claim:

1. A bidirectional communication line buffer apparatus provided on a bidirectional communication line which includes a bidirectional data line, said apparatus being positioned between and remote from each of first and second data transmitter/receiver units, said apparatus comprising:

a communication direction judgement means for judging the communication direction of data of said bidirectional data line;

a data length judgement means for judging a data length of said data in response to an output from said communication direction judgement means; and a bidirectional buffer circuit having a conductive state and a non-conductive state provided at least on said bidirectional data line and arranged to be made non-conductive on the basis of a data termination output produced from said data length judgement means after data is conducted, while the buffer circuit is in its conductive state, in the communication direction based on the communication direction output produced from said communication direction judgement means.

2. A bidirectional communication line buffer apparatus provided on a bidirectional communication line which includes a bidirectional data line and a bidirectional clock line, said apparatus being positioned between and remote from each of first and second data transmitter/receiver units said apparatus comprising:

a communication direction judgement means for judging the communication direction of clock signals of data of said bidirectional clock line;

a data length judgement means for judging a data length on the basis of the number of said clock signals of said data in response to an output from said communication direction judgement means; and a bidirectional buffer circuit having a conductive state and a non-conductive state provided at least on said bidirectional clock line and said bidirectional data line and arranged to be made non-conductive on the basis of a data termination output produced from said data length judgement means after data, which is moving in the same direction as the clock signals, is conductive, while the buffer circuit is in its conductive state, in the communication direction based on the communication direction output produced from said communication direction judgement means.

3. A bidirectional communication line buffer apparatus according to claim 2, wherein said data length judgement means includes a counter circuit.

4. A bidirectional communication line buffer apparatus according to claim 2, wherein said data length judgement means includes a monostable multivibrator circuit.

5. A bidirectional communication line buffer apparatus according to claim 4, wherein said monostable multivibrator circuit is of a trigger type.

6. A bidirectional communication line buffer apparatus according to claim 4, wherein said monostable multivibrator circuit is of a retrigger type.

* * * * *